United States Patent [19]
Hubbard

[11] 3,804,999
[45] Apr. 16, 1974

[54] ANTI-SKID VEHICLE BRAKING SYSTEM
[75] Inventor: Harold C. Hubbard, Lansing, Mich.
[73] Assignee: Motor Wheel Corporation, Lansing, Mich.
[22] Filed: Nov. 24, 1972
[21] Appl. No.: 309,214

Related U.S. Application Data
[60] Division of Ser. No. 161,885, July 12, 1971, which is a continuation-in-part of Ser. No. 97,431, Nov. 30, 1970, abandoned.

[52] U.S. Cl............ 200/80 R, 335/206, 303/21 CF
[51] Int. Cl. .......................................... H01h 35/10
[58] Field of Search ............ 335/206, 205; 180/105, 180/106; 73/519, 536; 307/120; 200/80 R 188/181 R, 303/21 CF

[56]   References Cited
   UNITED STATES PATENTS
3,653,471  4/1972  Burckhardt et al.................. 73/519
3,281,734  10/1966  Ansley............................... 335/206

Primary Examiner—Herman J. Hohauser
Attorney, Agent, or Firm—Barnes, Kisselle, Raisch & Choate

[57]   ABSTRACT

A non-skid brake control system for vehicles, particularly towed vehicles having electrically, pneumatically and/or hydraulically operated brakes controlled from the towing vehicle. A pair of braked wheels of the towed vehicle, one on each side of the vehicle, each have a speed sensing switch to sense the rate of rotation of the associated braked trailer wheel so as to provide anti-skid modulation to the associated brake when differential braking occurs between these braked wheels. The system automatically disables the anti-skid modulation when the vehicle speed is below an adjustable predetermined speed to thereby provide full braking effort under static, hill-holding or low speed conditions. Wheel speed sensing switch constructions are employed which utilize reed switches magnetically actuated by a permanent magnet carried on a centrifugally actuated flyweight mechanism. The anti-skid system may be further modulated by a vehicle speed sensing switch to prevent dual wheel lock-up above a given vehicle speed.

3 Claims, 11 Drawing Figures

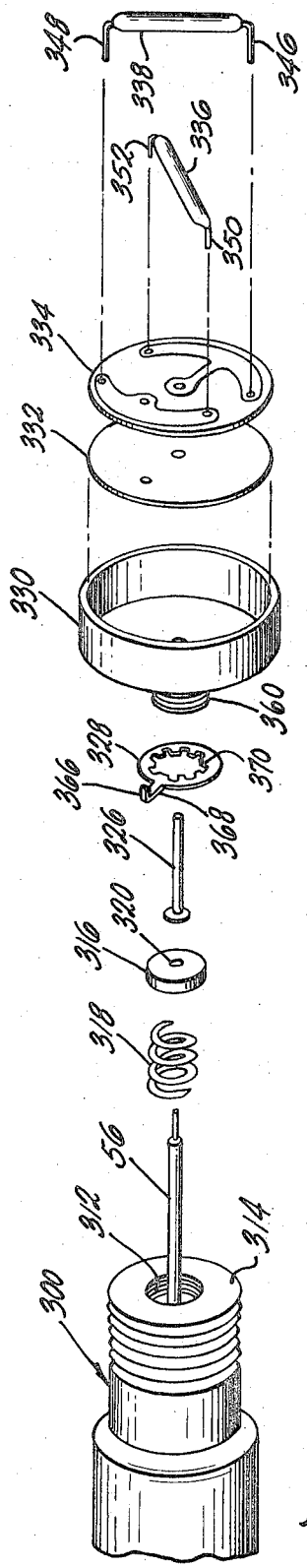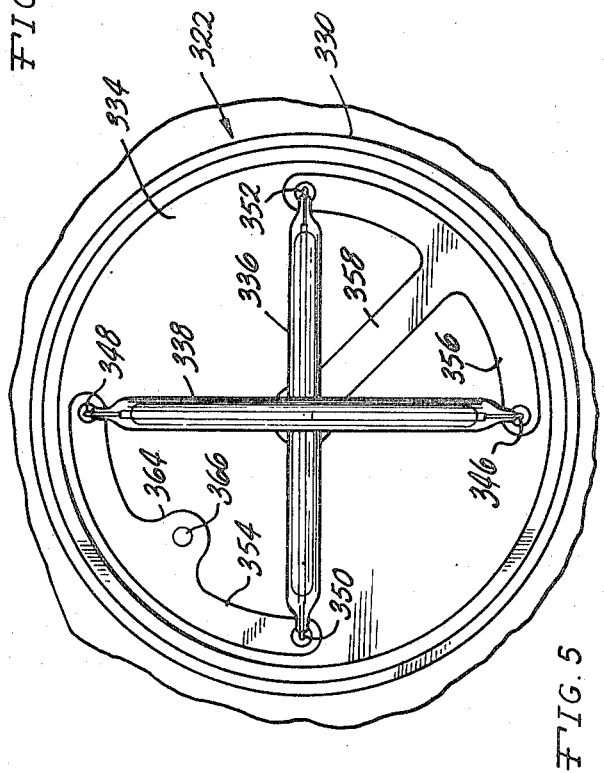
FIG. 4
FIG. 5

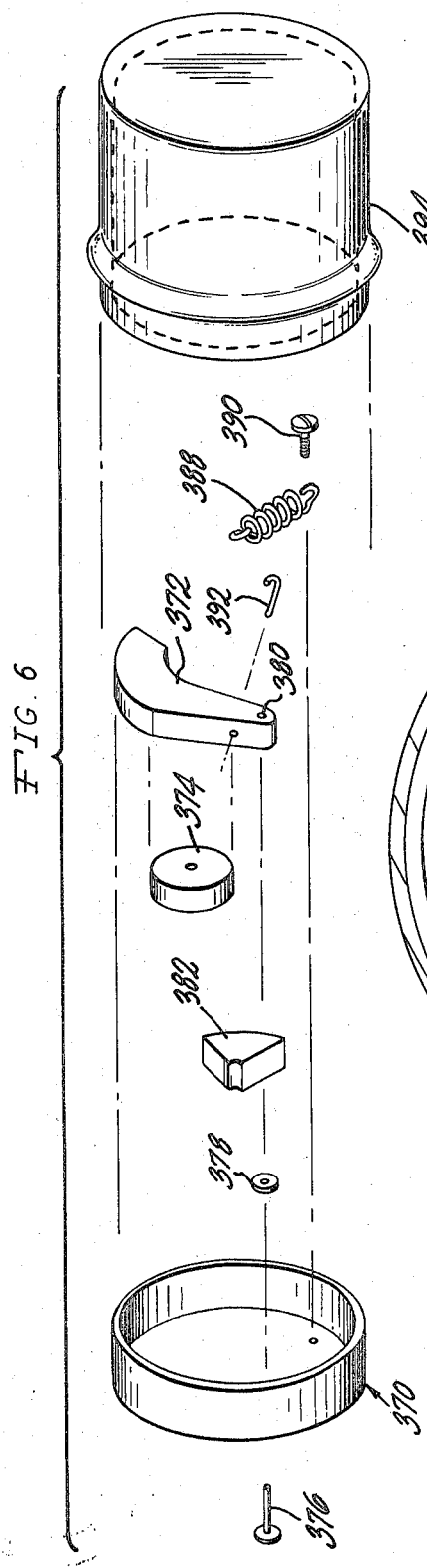
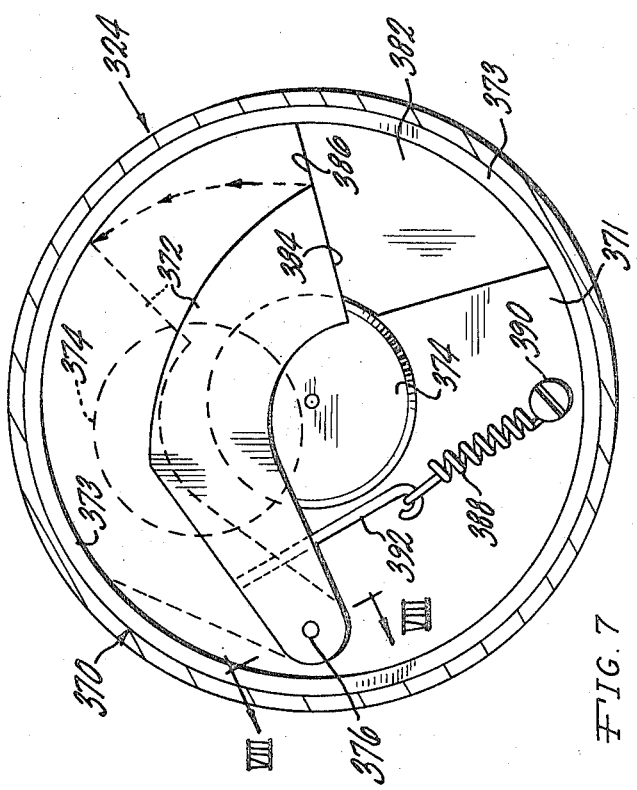

ANTI-SKID VEHICLE BRAKING SYSTEM

This is a division of application Ser. No. 161,885, filed July 12, 1971, which, in turn, is a continuation-in-part of Serial No. 97,431, filed Nov. 30, 1970, now abandoned.

This invention relates to automotive braking systems and more particularly to a system having anti-skid characteristics.

An object of the present invention is to provide a system of the above type having improved means for preventing the application of braking force to the braked wheels of a towed vehicle when the same are undergoing skid conditions.

Another object is to provide a system of the above character particularly adapted for anti-skid modulation of the conventional electric brakes of a mobile home or travel trailer.

Still another object is to provide an improved wheel speed sensing switch mechanism for and in a system of the above character which is accurate, sensitive, readily installed or disassembled for service, of economical construction and capable of reliable operation in an adverse environment.

Other objects as well as the features and advantages of the present invention will become apparent from the following detailed description taken in conjunction with the accompanying drawings wherein:

FIG. 4 is an exploded perspective view of the wheel spindle and non-rotary parts of the wheel speed sensing switch of FIG. 3.

FIG. 5 is a vertical sectional view taken on the line V—V of FIG. 3.

FIG. 6 is an exploded perspective view of the centrifugal flyweight magnet subassembly which are the rotary parts of the speed sensing switch of FIG. 3.

FIG. 7 is a vertical sectional view taken on the line VII—VII of FIG. 3.

FIG. 8 is a fragmentary sectional view taken on the line VIII—VIII of FIG. 7.

Figure 1:
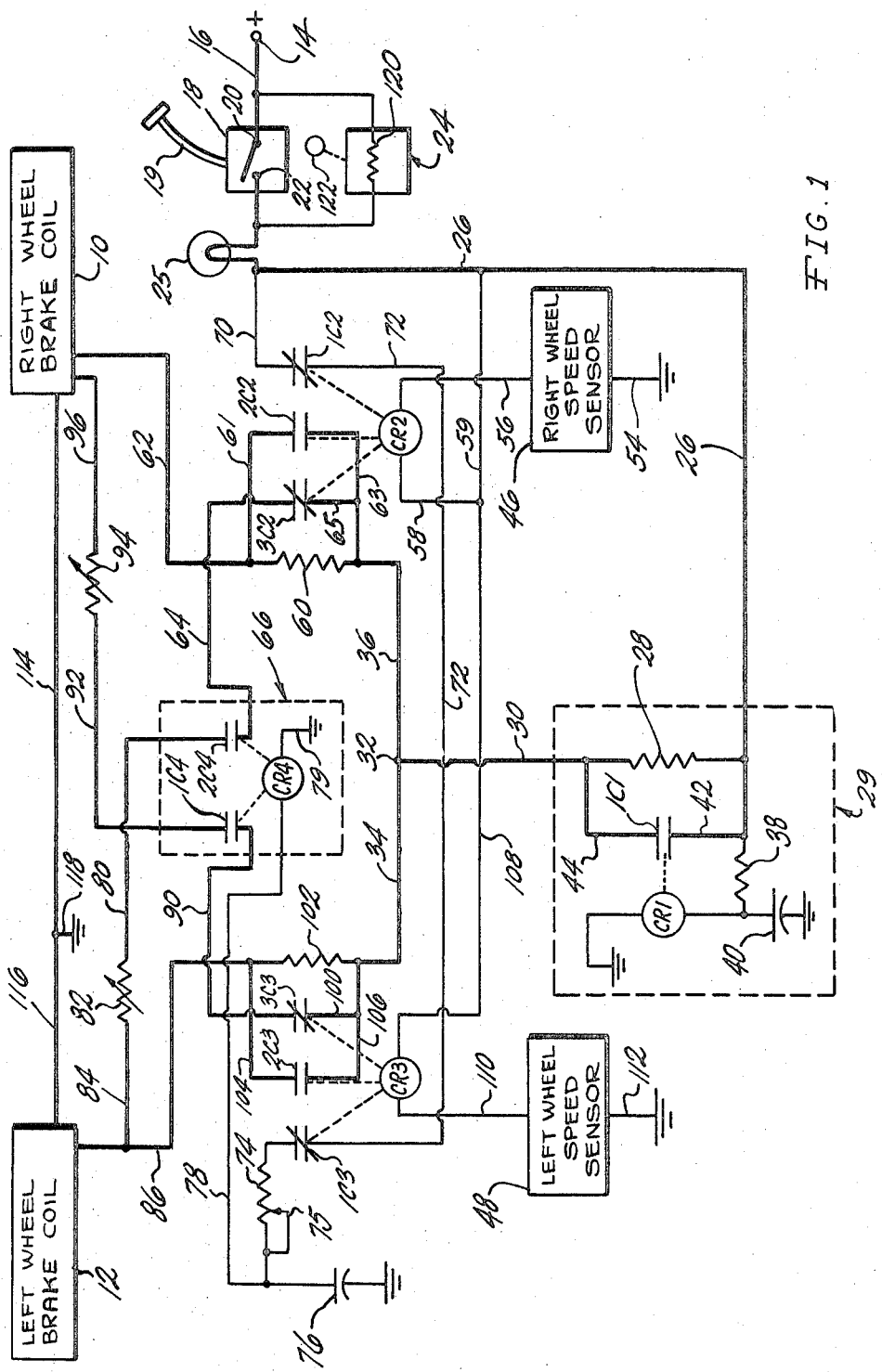
FIG. 1 is a schematic diagram of one embodiment of an anti-skid system of the present invention applied to the electric brake system of a towed vehicle.

Referring to FIG. 1, an exemplary but preferred embodiment of the anti-skid system of the present invention is shown adapted for use on a mobile home, travel trailer, or similar towed vehicle equipped with electric brakes such as those disclosed in U.S. Pat. No. 3,244,529. The system is set up for such a trailer having a pair of braked wheels, one on the right-hand side of the trailer and the other on the left (not shown), each equipped with this type of electric brake. The coils of the electromagnets or "pucks" of such right and left wheel brakes are indicated schematically at 10 and 12. Coils 10 and 12 are energized from a source 14 of DC current, usually the towing vehicle 12-volt battery. In series with a line 16 connected to the battery is a control switch 18, which may be the usual stop light switch of the towing vehicle, and hence the contacts 20 and 22 of switch 18 are closed by the first increment of downward travel of the brake pedal 19 of the towing vehicle. Paralleled with switch 18 is an optional anti-sway hand control 24 explained in detail hereinafter.

The main brake puck energizing lead 26 is connected from contact 22 in series with a stop light 25 to the input of an "easy on" stage 29. Resistor 28 of the stage is connected between lead 26 and lead 30 which is connected at junction 32 to branch left and right main leads 34 and 36 which in turn each branch into "direct" and "crossover" paths to coils 10 and 12 as explained hereinafter.

The "easy on" control circuit 29 includes limiting resistor 28 and a time delay network consisting of a resistor 38 and a grounded capacitor 40 connected in series between the junction of lead 26 with resistor 28 and ground. Circuit 29 also includes a coil CR1 of a first control relay which is connected between the junction of resistor 38 with capacitor 40 and ground. Relay CR1 controls a normally open set of contacts C1 connected in shunting relation with limiting resistor 28 by a lead 42 connected to the supply lead 26 and a lead 44 connected to the junction of lead 30 with resistor 28.

The right and left braked wheels of the trailer are equipped with wheel speed sensors indicated diagrammatically at 46 and 48 respectively. These sensor units may include the leaf spring type speed sensing switches as disclosed in U.S. Pat. Nos. 1,776,078 or 2,120,443, but preferably employ the improved speed sensing switch disclosed hereinafter and shown in FIGS. 3–8 inclusive. Sensor 46, if constructed pursuant to the aforementioned patents, consists of a switch actuating member pivoted on a support member which rotates with the wheel. The switch has a weight actuated by centrifugal force against the bias of a spring to throw the switch to the "on" (closed) condition in response to rotation of the wheel above a predetermined "crossover" speed (wheel angular velocity). The biasing spring pivots the actuating member to its other "off" (open) condition when the rotary speed of the wheel drops below the crossover speed. One terminal of the switch of sensor 46 is connected by a lead 54 to ground, and the other terminal of this switch is connected via a lead 56 to one side of a coil CR2 of a second control relay. The other side of coil CR2 is connected by leads 58 and 59 to the supply lead 26. Accordingly, when the right wheel is rotating above the crossover speed, the flyweight of sensor 46 biases the switch of sensor 46 to its closed condition, which in turn energizes relay coil CR2, and vice versa.

Relay coil CR2 controls normally closed contacts 1C2 and 3C2 and the normally open contacts 2C2, i.e., when relay coil CR2 is de-energized its controlled contacts 1C2 and 3C2 are closed and contacts 2C2 are open. Normally open contacts 2C2 are connected in shunting relation by leads 61 and 63 across a limiting resistor 60 which is connected in series via lead 36 and a lead 62 to the right wheel brake coil 10. Normally closed contacts 3C2 have one terminal connected by a lead 65 to lead 36 at its junction with resistor 60 and the other terminal is connected to a crossover lead 64.

Lead 64 is connected to normally open contacts 2C4 of a crossover relay control 66. Crossover control 66 has a control relay coil CR4 which is energized from source 14 via the series connections of a lead 70, normally closed contacts 1C2, a lead 72, normally closed contacts 1C3, a variable resistor 74 of a crossover time delay network, a lead 78 and a ground connection 79. Resistor 74 may be part of a potentiometer having its tap 75 connected to the junction of lead 78 with one terminal of a capacitor 76 of the time delay network, the other terminal of a capacitor 76 being grounded. Crossover control 66 has a second set of normally open contacts 2C4 controlled by relay coil CR4, contacts 1C4 and 2C4 being open when relay coil CR4 is de-energized. Contacts 2C4 when closed connect lead 64 with the brake energizing coil or armature 12 of the left-hand wheel via a crossover lead 80, a variable resistor 82, and a lead 84. The other contacts 1C4 of control 66 when closed connect a crossover lead 90 with right-hand puck 10 via a crossover lead 92, a variable resistor 94 and a lead 96.

The left wheel speed sensor 48 likewise controls a relay coil CR3 which controls contacts 1C3, 2C3 and 3C3. Contacts 1C3 and 3C3 are normally closed (closed when relay coil $R_3$ is de-energized), and contacts 2C3 are normally open. One terminal of normally closed contacts 3C3 is connected to crossover lead 90 and the other terminal to a lead 100 which is connected to the junction of lead 34 with a limiting resistor 102 in the main energizing path for left wheel brake coil 12. Normally open contacts 2C3 are connected by leads 104 and 106 in shunt across resistor 102.

Left wheel speed sensor 48 operates in the same manner as sensor 46 to close an energizing circuit for relay coil CR3 comprising a lead 108 connected between coil CR3 and lead 59, a lead 110 connected between coil CR3 and one terminal of the speed sensing switch of sensor 48 and a lead 112 connecting the other terminal of this switch to ground.

The ground terminals of coils 10 and 12 are connected by leads 114 and 116 respectively to a ground connection 118, which is normally connected back to the ground system of the towing vehicle, the battery of which usually serves as the source 14 of brake coil energizing current.

In operation, with the trailer stationary, speed sensor switches 46 and 48 are both open and thus relay coils CR2 and CR3 cannot be energized. If under this condition the towing vehicle brake pedal 19 is depressed to apply the towing vehicle brake, this action will also close contacts 22 and 20, thereby supplying 12 volt DC current from source 14 through brake light 25, lead 1C1 resistor 28 (which until shunted by closure of contacts 101 limits the brake energizing current to an "easy on" value) and through lead 30 to junction 32 where the current divides into the left and right parallel networks.

Considering first the right-hand network, the current flows through lead 36 and then through the series resistor 60 to coil 10, contacts 2C2 being open at this time. The value of blocking resistor 60 is such that the current supplied to coil 10 by this main energizing route is insufficient to produce braking force. However, it is sufficient to hold the electromagnet lightly against the armature plate of the electric brake unit so that it has a very slight dragging action thereagainst and cannot break loose from the plate. After an initial momentary delay, brake coil 10 does receive full energizing current from its associated crossover network, once resistor 28 has been shunted by contacts 101, as explained subsequently. Thus brake energizing current for coil 10 is supplied via lead 34, lead 100, the normally closed contacts 3C3, lead 90, the now closed contacts 104, lead 92, resistor 94 and lead 96. Contacts 1C4 were closed in response to closure of contacts 20 and 22 by actuation of brake pedal 19, which completes an energizing circuit for coil CR4 via lead 70, normally closed contacts 1C2, lead 72, normally closed contacts 1C3, resistor 74 and leads 78 and 79.

Likewise, under these conditions (trailer stationary) full braking current will also be supplied, after the aforementioned momentary delay, to the left-hand coil 12 through its associated crossover network, i.e., leads 36 and 65, normally closed contacts 3C2, lead 64, contacts 2C4, lead 80, resistor 82 and lead 84. The direct energizing path for coil 12, i.e., leads 34 and 86, like that for coil 10, is at this time blocked by resistor 102 because the speed sensing switch of sensor 48, like that of sensor 46, is open due to the left trailer wheel also being stationary.

Assume that the towing vehicle and trailer are traveling along a road at a speed above the crossover speed and that the towing vehicle brakes are not being applied. Under these conditions the speed sensing switches of sensors 46 and 48 are held closed by their associated governor weights. This completes the enabling circuit connection between grounds 54 and 112 and contact 22 for relay coils CR2 and CR3 so that they can be energized whenever contacts 20 and 22 are closed by switch 18. Hence when the towing vehicle brakes are applied by depressing brake pedal 18, contacts 20 and 22 will be closed to supply current from source 14 to lead 70 as well as to main lead 26, thereby energizing relay coils CR2 and CR3 and thus simultaneously opening contacts 1C2, 3C2, 1C3, 3C3 and closing contacts 2C2 and 2C3. Current now flows via lead 26, limiting resistor 28, lead 30, parallel leads 34 and 36, around resistors 60 and 102 via shunting contacts 2C2 and 2C3 respectively to thereby energize coils 10 and 12 via their associated direct energization circuits.

However, as mentioned previously this initial current is less than full braking current due to the limiting effect of resistor 28 of the "easy on" stage 29. This insures that coils 10 and 12 will be attracted against their respective rotating armature plates with less than full magnetization force. The value of resistor 28 is chosen so that the coils develop sufficient electromagnetic force to initially "grab" the armature plates and move with it, i.e., so that there is a static frictional engagement between the coil and plate. However, the holding power of the magnet is sufficiently limited so that this static frictional engagement can be broken by the increasing resistance of the associated electric brake mechanisms as they are moved from their released positions toward full engagement. Thus this "easy on" sequence prevents undue mechanical shock on the brakes and too sudden development of braking force.

The braking current is subsequently, on the order of one-tenth of a second or so later, increased to full value by the time delay circuit of stage 29 operating to shunt resistor 28. This occurs when capacitor 40 becomes charged through resistor 38 from lead 26 so that the current responsive relay coil CR1 is no longer shunted by capacitor 40. Sufficient current then flows from resistor 38 through relay coil CR1 to cause it to close the normally open contacts 1C1, thereby connecting leads 42 and 44 in shunt across resistor 28. Full braking current now flows from lead 26 through lead 42, contacts 1C1, lead 44 to lead 30, and thence via leads 34 and 36, through the closed shunting contacts 2C2 and 2C3 and leads 62 and 86 to coils 10 and 12 respectively. Thus full braking power is now developed at both the left and right braked trailer wheels.

Now assume that while being so braked the right trailer wheel encounters a slippery condition and thus loses traction, as compared to the left trailer wheel. This will cause the right wheel to be decelerated by its brake faster than the left wheel. When the right wheel has decelerated to a wheel speed below a given "crossover speed," the decreased centrifugal force acting on the governor weight of sensor 46 causes the switch thereof to open. This de-energizes relay coil CR2, thereby opening contacts 2C2 and closing contacts 1C2 and 3C2. Since crossover contacts 3C3 are still being held open by relay coil CR3 (as are contacts 1C3 and hence contacts 1C4), the opening of contacts 2C2 leaves resistor 60 as the only current path to the right-hand coil 10. Hence the energizing current supplied to coil 10 is reduced to a non-braking value, i.e., only enough to cause coil 10 to cling lightly to its associated armature point. This release of the right-hand trailer wheel brake thus allows the right wheel to reaccelerate even under the reduced traction conditions until it again reaches the crossover speed. At this point the switch of sensor 46 will close due to the increase in centrifugal force acting on its governor weight. Relay coil CR2 is therefore reenergized, closing contacts 2C2 to once again shunt resistor 60 so that full braking power is reapplied to coil 10. This sequence of release and reapplication of the right wheel brakes will occur rapidly and repetitively so that braking force is applied intermittently to the right-hand trailer wheel so long as the aforementioned slippery condition continues to exist and the trailer ground speed remains above a given value corresponding to that required to impart to the wheel a rotational velocity in excess of the crossover speed. Accordingly, the braked right trailer wheel is automatically prevented from going into a skid.

The closing of normally closed contacts 1C2 due to de-energization of relay coil CR2 in response to the right wheel dropping below the crossover speed does not activate the crossover relay CR4 because normally closed contacts 1C3 are, under the foregoing conditions, still being held open by relay CR3 because the left wheel is still running above the crossover speed and hence the switch of sensor 48 is still closed.

Of course, if the left-hand trailer wheel were "seeing" a slippery condition rather than the right-hand wheel, then the left-hand wheel would be subjected to the above-described intermittent anti-skid modulation of the braking force applied thereto due to the similar action of the anti-skid sensor 48 for that wheel.

Should both the left and right trailer wheels simultaneously encounter equally slippery conditions when being braked while above crossover speed, thereby causing the wheels to simultaneously decelerate, it is possible that the speed sensing switches of their respective sensors 46 and 48 will open at the same time. The resulting simultaneous de-energization of relay coils CR2 and CR3 will open both shunts 2C2 and 2C3 around resistors 60 and 102, thus releasing both brakes. This will also allow contacts 1C2 and 1C3 to simultaneously close to complete the energizing path to relay coil CR4. However, coil CR4 will not be energized at this time because capacitor 76, being uncharged, serves as a shunt to ground across relay coil CR4 for a short period of time corresponding to the RC time of capacitor 76 and resistor 74. The purpose of this time delay in the energization of relay CR4 is to prevent reapplication of current to the wheel brakes through their associated crossover networks, which otherwise would negate the release of brake energizing force which occurred when contacts 2C2 and 2C3 opened in response to de-energization of relay CR2 and CR3. Thus the simultaneous reduction in speed of both wheels below their crossover speeds results in release of braking force on both wheels. Both wheels can then reaccelerate back up to the crossover speed.

The charge time of the crossover time delay circuit 74–76 is adjusted by tap 75 to allow the simultaneously skidding wheels to reaccelerate back up to the crossover speed before crossover relay CR4 can become energized to cause full braking current to be supplied to the brakes through their crossover networks. Thus, should both wheels continue to see the same braking effort and the same skidding conditions, both wheels would be identically modulated so that they would continue to be repetitively decelerated, released and reaccelerated together. However, this would be an unusual condition due to the many variables affecting the speed of each wheel. Hence, normally the individual wheels will again go into their independently modulated anti-skid operation.

When the towed vehicle has slowed down enough to drop the maximum speed of the braked wheels below the crossover speed (the towing vehicle brakes still being applied), the resultant opening of both of the speed sensor switches 46 and 48 will deenergize relays CR2 and CR3, thereby opening contacts 2C2 and 2C3. Although this opens the shunt contacts 2C2 and 2C3 around resistors 60 and 102 and thus releases the brakes, this action is only momentary because contacts 1C2 and 1C3 are simultaneously closed and, after a short delay which is only on the order of 0.5 to 0.7 second, the crossover time delay network 74–76 times out, thereby energizing coil CR4 which closes contacts 1C4 and 2C4 to thus shunt the blocking effect of resistors 60 and 102 in the direct brake energization paths. Hence, braking current will be supplied to the right- and left-hand brakes through their associated crossover networks. Thus, when the maximum achievable wheel speed is below the crossover speed, the brakes are applied without anti-skid modulation.

Another preferred but optional feature of the anti-skid circuit of the invention is the provision of adjustable resistors 82 and 94 in the respective crossover circuits. These resistors function to reduce the braking current supplied to coils 10 and 12 when the wheels are below the crossover speeds from that supplied when the wheels are above the crossover speed. Resistors 82 and 94 are adjusted to supply sufficient current to brake coils 10 and 12 to produce a braking force which is below that which would produce a skid of the braked wheel at low vehicle speed, i.e., from say 10 miles per hour to zero, assuming that traction for the wheel is fairly good, as on sand, loose gravel or better. Thus the brake system when equipped with resistors 82 and 94 automatically "lets up" on the brakes when the vehicle speed drops below the crossover speed under no skid conditions.

Another optional but preferred feature is the anti-sway hand control 24 which normally would be used to correct a side sway condition of the towed vehicle. Control 24 includes a variable resistor 120 connected in shunt across the contacts 20 and 22 of the brake light switch 18. The resistance value of resistor 120 is varied by manual actuation of a control lever 122 so that the vehicle operator can control the trailer brakes independently of the towing vehicle brakes but only when the towing vehicle brakes are not being applied. This would require only a momentary actuation of control lever 122 from a full resistance toward a decreased resistance position to thereby lightly apply the trailer brakes. Usually the amount and/or duration of this hand controlled braking is not sufficient to decelerate one or the other of the trailer wheels to a skidding condition, i.e., below its crossover speed. However, if control 24 is left on for a sufficient length of time to decelerate the wheels to a skidding condition, the braking effort being applied under manual control to the wheels would be modulated by the anti-skid circuitry described previously.

Preferably leads 26 and 70 are adapted to be connected to the towing vehicle stop light wiring which normally runs through the trunk of the towing vehicle. This can be done conveniently by the use of an adapter jumper having insulation puncturing type connectors and a female socket so that a standard male plug wired to leads 70 and 26 can be inserted into the socket. With this arrangement the electric brake system of the trailer is energized and controlled from the tail light wiring of the towing vehicle. Since coils 10 and 12 draw at the maximum about six amperes of current, such a direct connection is feasible if the wiring system for the towing vehicle tail light can handle this much load in addition to the other lighting requirements on this circuit. If not, leads 26 and 70 can be connected through a relay to a battery in either the towing or towed vehicle, and only the relay energizing connection is made to the towing vehicle stop light wiring as described above. The relay thus would be energized by closing switch 18 to thereby connect the battery to the brake energizing current leads, thereby limiting the current draw on the towing vehicle stop light circuit. Alternatively, leads 26 and 70 may be connected to the stop light terminal 22 to thus bypass the wiring from this terminal to the towing vehicle stop lights because the current carrying capacity of lead 16 to switch 18 is usually greater than that of the wiring running from switch 18 to the stop lights.

Another feature of the anti-skid system of the invention is its non-responsiveness to blinker light turn signal systems. When the anti-skid circuitry is connected to the towing vehicle stop light circuit as described above, the operation of the flasher turn signals on the towing vehicle will not actuate the trailer brakes because of the built-in time delay provided by stage 29 in the anti-skid system, i.e., capacitor 40 will not charge within the short period of time available in the duty cycle of the conventional (and mandatory) flasher turn signal system. Hence relay coil CR1 cannot be energized and thus limiting resistor 28 will not be shunted by turn signal operation.

Figure 2:
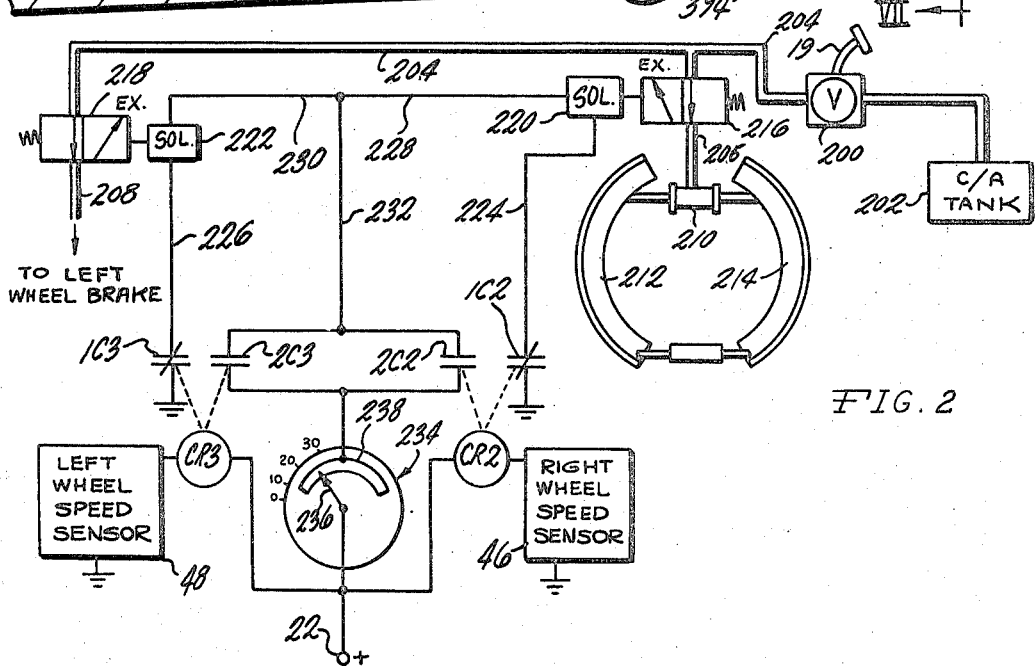
FIG. 2 is another embodiment of an anti-skid system of the present invention applied to the pneumatic brake system of a towed vehicle.

Referring to FIG. 2, another embodiment of the anti-skid braking system of the present invention is shown applied to the fluid operated brakes of a tractor and/or trailer. This pneumatic braking system includes the usual brake foot pedal control 19 which operates an air valve 200, the valve being opened by depressing the pedal to thereby connect a source 202 of compressed air or hydraulic fluid under pressure to a supply distribution line 204. Line 204 branches into conduits 206 and 208 which supply the pressure fluid to the respective wheel cylinders of the brake members associated with the right and left wheels respectively. Since the right and left brakes are identical only the wheel cylinder 210 and brake shoes 212 and 214 associated with the right brake wheel are shown in FIG. 2. A pair of two-way solenoid operated dumping valves 216 and 218 are connected respectively in branch conduits 206 and 208. These valves are individually controlled by solenoids 220 and 222 respectively. When solenoids 220 and 222 are de-energized, valve 216 and 218 are spring biased to the positions thereof shown in FIG. 2 wherein the valves are open to deliver pressure fluid to the associated wheel cylinders. When solenoids 220 and 222 are energized, valves 216 and 218 are shifted to an exhaust position wherein the supply of pressure fluid is cut off and the wheel cylinders are connected to bleed rapidly to atmosphere (or to a reservoir in a hydraulic system).

Solenoid 220 has one of its terminals connected to ground via a lead 224 and normally closed contacts 1C2 which are controlled by relay coil CR2 associated with the right wheel speed sensor switch 46 described previously. Similarly, one terminal of solenoid 222 is connected to ground via lead 226 and normally closed contacts 1C3 controlled by relay coil CR3 associated with left wheel speed sensor 48. The other terminals of solenoids 220 and 222 are connected by leads 228 and 230 to a common lead 232 which is connected to one terminal of a vehicle speed sensing switch 234 through a pair of paralleled, normally open contacts 2C2 and 2C3 which are controlled by relay coils CR2 and CR3 respectively. The other terminal of switch 234 is connected to the output terminal 22 of the towing vehicle stop light switch 18 as described previously.

Switch 234 preferably is connected to the vehicle speedometer and has a wiper 236 which moves with the speedometer needle so as to be in electrically conductive contact with a brush strip 238 throughout a given range of vehicle speed, as from 10 m.p.h. up to maximum vehicle speed. Wiper 236 thus moves out of contact with strip 238 to break the connection between lead 232 and terminal 22 when the vehicle speed drops below 10 m.p.h., for example.

In operation, assuming the towing vehicle is moving along the road above 10 m.p.h. and hence switches 46 and 48 are closed, when the towing vehicle brake pedal 19 is depressed to apply the brakes on the towed vehicle or trailer pressure fluid will be distributed to the brakes of the left and right wheels of the trailer via line 204 and line 206 and 208 to thereby apply braking forces to these wheels. Under these conditions, valve 216 and 218 are in their "brake supplying" positions shown in FIG. 2 because solenoids 220 and 222 cannot be energized due to contacts 1C2 and 1C3 being held open by the energized relay coils CR2 and CR3, even though contacts 2C2 and 2C3 are closed by such energization of coils CR2 and CR3. Thus if, in the example given above, the crossover speeds of sensors 46 and 48 are both set for the same wheel speed corresponding to a vehicle speed of 10 m.p.h. or less, then under non-skid conditions the switches of sensors 46 and 48 will remain closed to thus hold open contacts 1C2 and 1C3 in the energizing circuit to solenoids 220 and 222 until the braked wheels have decelerated below such crossover speed, at which point sensors 46 and 48 cause de-energization of relay coils CR2 and CR3, thereby closing contacts 1C2 and 1C3 but also opening contacts 2C2 and 2C3. Under non-skid conditions this action of sensors 46 and 48 will occur substantially simultaneously. Hence brake pressure will continue to be applied to the braked wheels until the vehicle is brought to a stop. If the crossover speed of sensors 46 and 48 is set such that the sensor switches open at the same time that wiper 236 leaves contact with strip 238 as the towing vehicle slows below 10 m.p.h., the solenoid energizing circuit will also be opened at wiper switch 234. Switch 234 thus is an override anti-skid disabling switch which prevents anti-skid modulation of the brakes when vehicle speed is between zero and say 10 m.p.h.

Assuming that the vehicle is traveling on the road at say 40 m.p.h. and brake pedal 19 again is depressed to apply the trailer brakes, and the right braked wheel encounters a slippery or skidding condition while the vehicle still is traveling at a speed above 10 m.p.h. This will cause the right wheel to be decelerated by its brake more rapidly then the left wheel. When the right wheel drops below its crossover speed, sensor 46 will open. This de-energizes relay coil CR2, thereby opening contacts 2C2 but closing contacts 1C2. Hence energizing current can now flow from terminal 22 through the vehicle speed sensing switch 234, closed contacts 2C3, lead 232, lead 228, solenoid 220, lead 224, and contacts 1C2 to ground. This energizes solenoid 220 and causes it to shift dumping valve 216 in a left-hand direction as viewed in FIG. 2, thereby cutting off the supply of pressure fluid to wheel cylinder 210 and at the same time connecting cylinder 210 to atmosphere (or to a hydraulic reservoir) via the exhaust port of valve 216. Hence actuating pressure is dumped rapidly from the right wheel brakes, thereby releasing the brakes and allowing the right wheel to reaccelerate. When the wheel has reaccelerated above its crossover speed, sensor 46 will close again, thereby de-energizing solenoid 220, thus causing valve 216 to be shifted by its spring back to the normal pressure supply position shown in FIG. 2. Since the brake pedal 19 has been continually depressed during this action, pressure fluid remains available in line 204 and is once again supplied via valve 216 to cylinder 210 to reapply the right wheel brakes. This anti-skid modulation occurs with a very rapid on-off sequence, thereby developing maximum braking effectiveness short of skidding.

Should the left braked wheel instead of the right wheel encounter slippery or skidding conditions, a similar anti-skid modulation will be applied to the pneumatic brakes for the left wheel due to the similar action of sensor 48 and associated solenoid 222.

Should both the left and right braked wheels encounter identical slippery conditions and hence conjointly decelerate below the crossover speed, they both will be released due to their associated speed sensors 48 and 46 causing contacts 2C3 and 2C2 to both open so that the brakes cannot be released. However, if desired the previously described crossover networks and time delay circuit 74-76 can be added to produce anti-skid modulation under such relatively rare conditions.

When the vehicle has been slowed to a ground speed of 10 m.p.h., switch 234 will open the energizing circuit for both solenoids 220 and 222, thereby removing the anti-skid modulation from the braking system. Hence full braking force will be applied to both wheels, or at least as much force as is being demanded by the vehicle operator's positioning of the brake pedal 19. Although the one or both wheels can now lock up should they encounter a slippery condition, a skid can usually be tolerated at this time because the vehicle has been slowed sufficiently to reduce the major hazard of skidding. Of course, the example of 10 m.p.h. can be reduced by extending the strip 238 so that wiper 236 only brakes the anti-skid circuitry when the vehicle is running between say zero and 5 m.p.h., for example.

Figure 3:
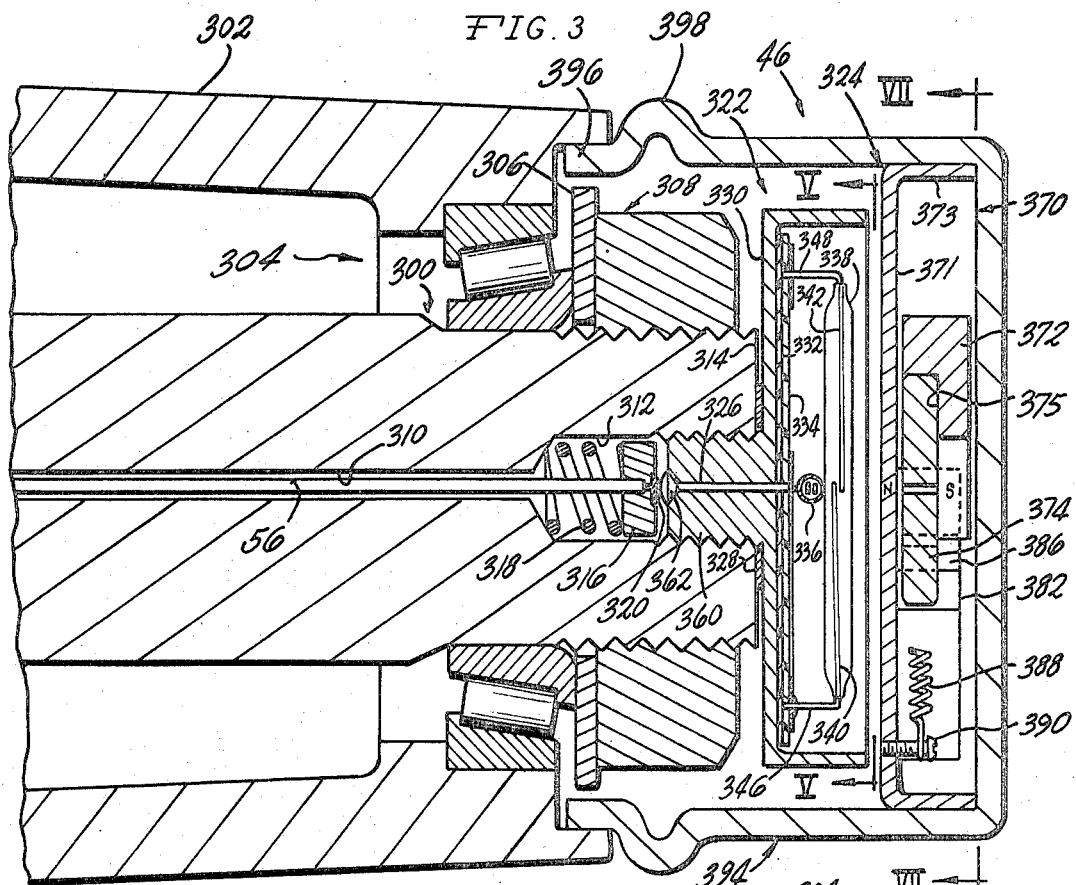
FIG. 3 is a vertical sectional view along the axis of a wheel spindle of a trailer illustrating a one embodiment of the speed sensing switch constructed in accordance with the present invention.

Referring to FIGS. 3 - 8 inclusive, an exemplary embodiment of a speed sensor switch construction in accordance with the present invention is illustrated for application to the conventional wheel hub and spindle structure commonly used on mobile home and travel trailer undercarriages. Thus as shown in FIGS. 3 and 4, wheel spindle 300 extends through a hollow wheel hub 302 which is rotatably mounted thereon by bearings 304, the outboard bearing assembly being captured by a washer 306 held by a wheel nut 308 threaded on the outer end of spindle 300 and suitably non-rotatably keyed thereto. Spindle 300 is secured to the axle assembly and hence is a non-rotary part. Spindle 300 has an axial bore 310 opening to a counterbore 312 which is threaded for about half its depth from the outer end face 314 of spindle 300. The previously described lead 56 is brought out through bore 310 and is secured to a contact button 316 which is biased axially outwardly by a coil spring 318 housed in counterbore 312. Lead 56 is connected to a silver solder button 320 which forms a rounded protuberance on the end face of contact button 316.

The speed responsive switch mechanism of speed sensor 46 consists of two principal subassemblies, a non-rotary switch subassembly 322 made up of the parts shown in FIGS. 4 and 5, and a rotary centrifugally actuated permanent magnet assembly 324 shown in FIGS. 6 and 7. Referring first to FIGS. 3 and 4, the non-rotary switch subassembly 322 comprises a terminal pin 326, a shake-proof grounding terminal 328, a housing 330, an insulating disc 332, a disc-shaped printed circuit board 334, and two commercially available glass encapsulated reed switches 336 and 338. As best seen in FIG. 3, each of the glass switches contains a pair of thin flexible electrically and magnetically conductive reeds 340 and 342 which extend within the glass envelope towards one another from their associated opposite terminals 346 and 348 of the switch and overlap at their free ends at the center of the envelope. As is well known in the art, when such reeds 340 and 342 are subjected to a magnetic field of proper distribution, strength and polarity, they will be attracted together at their overlapping free ends to make an electrical contact therebetween.

Switches 336 and 338 are mounted with their respective longitudinal axes at right angles to one another and parallel to the plane of board 334. Switch 338 has longer terminal prongs 346 and 348 than the corresponding prongs 350 and 352 of switch 336 to thereby support switch 338 farther out from the board than switch 336. Board 334 has a conductive strip or lead 354 of arcuate shape imprinted therein by conventional printed circuit board deposition and etching techniques so as to extend for about 90° adjacent the margin of the board. Another conductor strip 356, also of arcuate shape and extending for about 90°, is located on board 334 diagonally opposite strip 354. Strip 356 has a radially inwardly extending stem portion 358 which runs from the center of strip 356 radially inwardly to the center of board 334. Switch 338 has one prong 348 extending through a silver solder electrical connection with one end of strip 354 and its other prong 346 has a similar connection with the diagonally opposite end of strip 356. Likewise, switch 336 has its prongs 350 and 352 similarly connected to the other ends of strips 354 and 356. Preferably, the switch prongs extend all the way through board 334 and are silver soldered to the conductor strips to provide a secure mounting of glass switches 336 and 338 to board 334.

Terminal pin 326 extends through a hub 360 of housing 330 (FIG. 3) and has its outer end mechanically and electrically connected to the inner end of conductor portion 358. The inner end of pin 326 has a rounded head to provide a contact button 362 which abuts button 320 to thereby make electrical contact with lead 56. Preferably housing 330 is made of electrically insulating material such as Bakelite, and circuit board 334 is adhesively secured to disc 332 which in turn is adhesively secured to the bottom face of the cup-like cavity in housing 330. Likewise, lead 56 is insulated and button 316 is made of plastic insulating material. Disc 332 may be made of steel or other ferromagnetic material to help serve as a magnetic shield for isolating switches 336 and 338 from stray magnetic fields. Conductive strip 354 has a terminal portion 364 extending radially inwardly at its center with an aperture for receiving a tang 366 which is secured to portion 364 by a silver solder electrical and mechanical connection. Tang 366 (FIG. 4) is integrally connected to a radial arm 368 of ground terminal 328 which slips onto hub 360 so as to be clamped against face 314 of spindle 300 by the radial wall of housing 330, as best seen in FIG. 3. Washer 328 has a series of alternately inwardly and outwardly bent spring teeth 370 which dig into the face 314 of the steel spindle 330 so that washer 328 serves as both a lock washer for housing 330 and a good electrical ground.

It will be noted that switches 336 and 338 are connected in parallel between conductor strips 354 and 356 so that both switches must be open to provide an open circuit between lead 356 and the ground connection 328 to the wheel spindle 300. In the absence of the influence of a proper magnetic field as explained hereinafter, this dual open condition will be the normal position of switches 336 and 338.

Referring to FIGS. 3, 6, 7 and 8, the rotary subassembly 324 comprises a cup-like housing 370, a flyweight made up of a non-magnetic carrier arm 372 and a ceramic disc magnet 374 adhesively secured in a semicircular pocket 375 (FIG. 3) formed in the inboard face of carrier 372, a rivet 376 which extends through a hole in the backwall of housing 370, through a washer 378 and then through a hole 380 in carrier 372 to pivotally mount the carrier on the housing. Subassembly 324 also includes a sector-shaped flyweight stop 382 affixed as by an adhesive to the inner surface of the bottom wall 371 and side wall 373 of housing 370 generally diametrically opposite pivot pin 376. The end face 384 of carrier 372 is biased into abutment with the side face 386 of sector 382 by a tension coil spring 388 secured at one end to wall 371 by an anchor screw 390 and at the other end to the flyweight by a screw hook 392. Housing 370 is inserted open end first into the open end of a cup-shaped grease cap 394 and is adapted to be seated with a force fit in the outer end of the grease cap as shown in FIG. 3 to thereby form a closure for the flyweight assembly. Cap 394 in turn has an entrance flange 396 adapted to be telescoped with a press fit within the outer end of the wheel hub 302 as shown in FIG. 3 to thereby secure cap 394 and the flyweight subassembly 324 for rotation with the wheel hub 302. Cap 394 has a circumferential rib 398 (FIG. 3) adapted to limit inward telescoping movement of cap 394 such that the housing end wall 371 is spaced axially outwardly a predetermined distance from the outboard end of housing 330 of the switch subassembly 322.

In operation, speed sensor 46 of the present invention provides a speed responsive switch mechanism adapted to sense the angular velocity of the vehicle wheel attached to wheel hub 302 to perform the function of sensor 46 in the anti-skid circuitry described previously. When the wheel hub 302 is stationary, the magnet 374 is positioned as shown in FIGS. 3 and 7 in coaxial alignment with spindle 300 wherein the rotational axis of hub 302 intersects the center of magnet 374 as well as the overlapped ends of the reeds in switches 336 and 338. Magnet 374 is axially polarized as indicated in FIG. 3 so that, for example, the inboard end face of magnet 374 presents a north pole having a uniform field concentration centered about the axis of magnet 374, and likewise the outboard face of magnet 374 emits a uniform south magnetic field about the axis of the magnet. Hence the alignment of this permanent magnetic field coaxially with switch subassembly 322 brings the field center of one of the poles of the magnet coincident with the overlapped ends of the reeds of the glass switches 336 and 338. Under these conditions the induced magnetization in the reeds of the switches is at a minimum and is insufficient to draw the overlapped ends of the reeds in either of the switches into electrical contact with one another. Hence when the wheel is stationary, an open circuit exists between the lead 56 and vehicle ground (represented by spindle 300).

When the magnet flyweight subassembly 324 is rotated about the axis of rotation of wheel hub 302 in response to wheel rotation, centrifugal force acting on the flyweight 372–374 causes magnet 374 to pivot radially outwardly about the axis of pin 376 against the yieldable restraint of spring 388. When the rotational velocity of the wheel exceeds a given value, the centrifugal force acting on the flyweight subassembly will be sufficient to pivot carrier 372 into its outermost position where it abuts against flange 373 of housing 370, thereby positioning magnet 374 in the position shown in broken lines in FIG. 7. As magnet 374 moves outwardly in response to wheel acceleration its center will travel in a spiral path concentric with the axis of spindle 300, and this path will be circular at any constant wheel velocity between zero and the given value. As the radius of this path of magnet travel increases, the magnetic field center emanating from magnet 374 will move outwardly away from the overlapped free ends of the reeds of switches 336 and 338 toward the outer ends of the reeds. This sets up an unbalanced flux distribution along the reeds so that a portion of the flux flows from one reed across the air gap at its free end to the free end of the other reed. The flux concentration across the reed air gaps increases as the magnet is moved off center and outwardly relative to the reeds. At some given point in the outward swing of magnet 374, such as its outermost position shown in dotted lines in FIG. 7, corresponding to a given rotational velocity of the wheel, the flux concentration in the reeds will increase to a point where the magnetic attraction generated between the free ends of the reeds is sufficient to draw the free ends together into electrical contact.

Since magnet 374 is traveling in a circular path, its field pole traverses one reed of each switch every 90° of wheel rotation. At the crossover speed the diameter of the magnet path is sufficiently large to cause the induced magnetization in one of the reeds when the magnet is within 45° of either side of the one reed to close the reed switch. Accordingly, each switch will close and then reopen twice per revolution of the magnet. This angular effective closing range of the magnet as it approaches, crosses and then leaves each reed varies with the diameter of the circular path of travel of the magnet, being less when the magnet is closer to centered position and greater as the diameter of the circular path of travel increases. This relationship, of course, is a function of the strength of the magnet, the spacing between its plane of rotation and switches 338 and 336 and the sensitivity of the switches. However, once the magnet has swung out to the path of given diameter corresponding to crossover speed, the closure time of each switch will preferably overlap that of its companion switch so that there is always a completed circuit from the conductor strip 354 to the conductor strip 356 and hence from lead 56 to vehicle ground. When the magnet moves inwardly beyond the given point where these closure times of switches 336 and 338 no longer overlap, there will be an open circuit because both switches are open simultaneously for a short period four times per revolution of the magnet. This open circuit condition increases as the magnet swings toward center until both switches remain open constantly. However, this fast on-off cycling of the speed sensor 46 during this interim period between continuously closed and continuously opened conditions is too short a period of time to actuate the anti-skid system due to the time delay of relays CR2 and CR3 plus the even greater time delay provided by the easy-on stage 29. Hence even when the vehicle is running at a constant speed precisely at the crossover speed of the sensors 46 and 48, there will be no false disabling action of the anti-skid system as a result of the intermittent transition operation of the preferred embodiment of the speed sensing switch 322-324 of the present invention.

Figure 11:
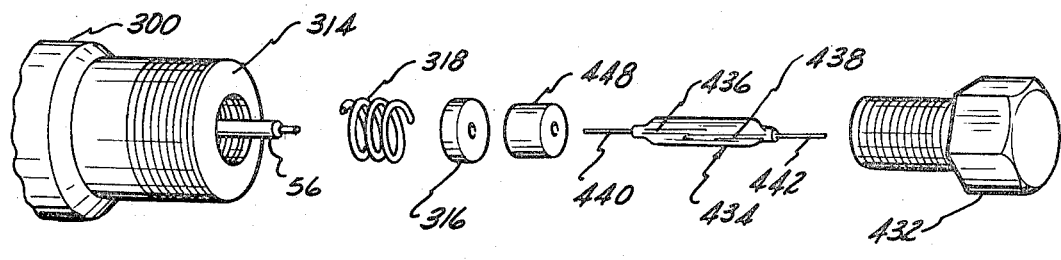
FIG. 11 is an exploded perspective view of the wheel spindle and nonrotary parts of the wheel speed sensing switch of FIG. 10.
Figure 10:
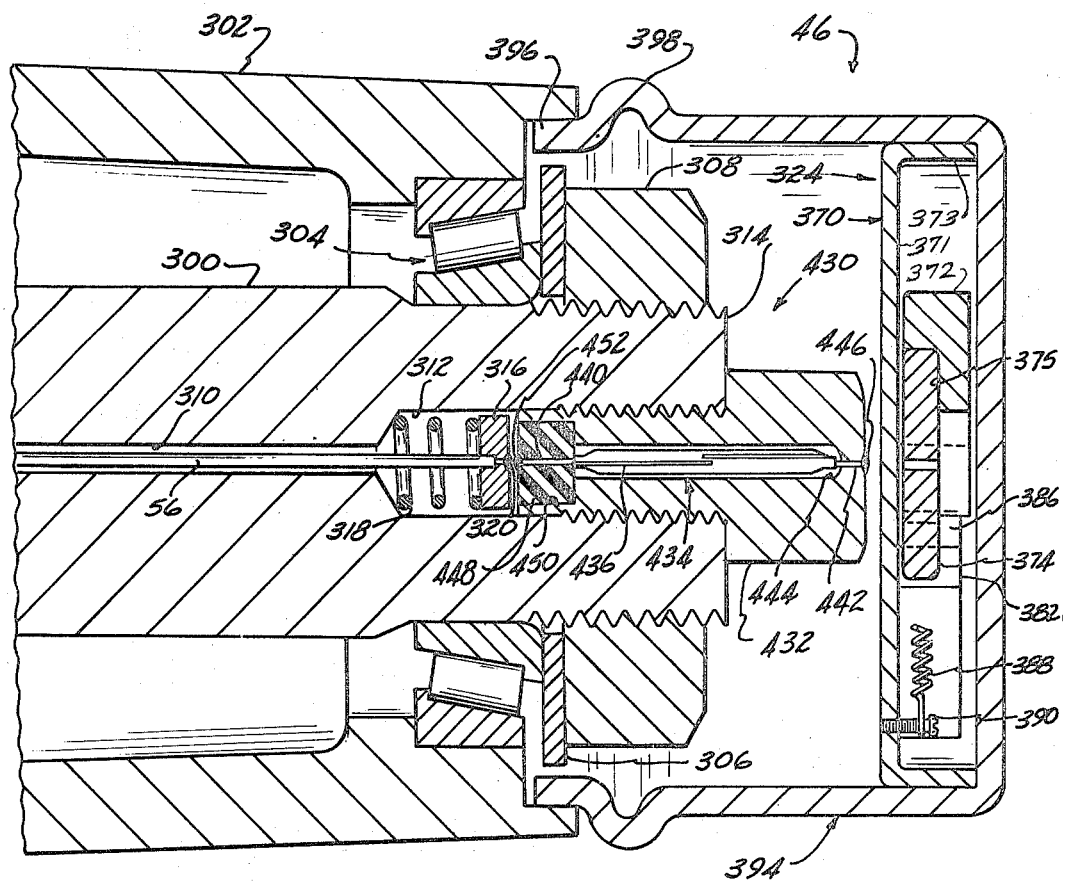
FIG. 10 is a vertical sectional view along the axis of a wheel spindle of a trailer illustrating another embodiment of a speed sensing switch constructed in accordance with the present invention.

FIGS. 10 and 11 illustrate another embodiment of a speed sensor switch constructed in accordance with the present invention mounted on a conventional wheel hub and spindle structure. The embodiment of FIGS. 10 and 11 is similar to the speed sensor switch of FIGS. 3 through 8 and hence, those components which are identical to the components previously described in FIGS. 3 through 8 are given like reference numerals and their description is not repeated. This switch mechanism has a rotary centrifugally actuated permanent magnet subassembly 324 and a nonrotary switch subassembly 430 with a housing 432 of an electrically conductive non-magnetic material such as aluminum or brass threadably received in counter bore 312 of spindle 300. A glass encapsulated reed switch 434 containing reed 436 and 438 and having associated terminals 440 and 442 is axially received in a blind hole 444 in housing 432. Lead 438 extends through a hole in the head end of housing 432 and is electrically and mechanically connected thereto by a drop of silver solder 446. Lead 440 extends through a round disc 448 of a plastic electrical insulating material pressed into a counter bore 450 in the threaded end of housing 432 and terminates in a silver contact button 452 adapted to abut with button 320 to make electrical contact with lead 56.

The reed switch of the sensor mechanism of FIGS. 10 and 11 is axially aligned with the poles of magnet 374 when wheel hub 302 is stationary. When the magnet is in this coaxial position, the inboard end face of the magnet presents a north pole, for example, having a uniform magnetic field coaxial with switch subassembly 430 which induces sufficient magnetization in reeds 438 and 436 to draw the over lapped ends of the normally spaced apart reeds into engagement and electrical contact with each other. Hence when wheel hub 302 is stationary, a closed circuit exists between lead 56 and vehicle ground (represented by spindle 300).

When the magnet fly wheel subassembly 324 is rotated in relation to spindle 300 in response to wheel rotation due to movement of the towed vehicle, centrifugal force acts on flyweight 372-374, causing magnet 374 to pivot radially outwardly. This radially outward movement of magnet 374 shifts the magnetic field radially away from the axis of switch 434 and hence decreases the strength of the magnetic field acting on the reeds of switch 434. At some point, preferably as the flyweight approaches wall 373 of housing 370, the induced magnetization of reeds 436 and 438 will be decreased sufficiently to allow the over lapped ends to disengage and thereby open the switch and the circuit to which it is connected. Thus, in this speed responsive mechanism, switch 434 is closed when the wheel hub is rotating slower than the cross over speed and is open when the hub is rotating faster than the cross over speed. The opening and closing cycle of switch 434 by the radial position of magnet 374 is just the opposite of the cycle of switches 336 and 338 of the speed responsive mechanism shown in FIGS. 3–8 wherein switches 336 and 338 are open at hub speeds below the cross over speed and closed at hub speeds above the cross over speed. Therefore, when using the sensor mechanism of FIGS. 10 and 11, it is necessary to substitute for control relays CR2 and CR3 a pair of corresponding relays having normally open rather than normally closed contacts 1C2, 3C2, 1C3, and 3C3 and normally closed rather than normally open contacts 2C2 and 2C3. With this slight modification of the circuitry of FIG. 1, the sensor of FIGS. 10 and 11 will function in substantially the same manner and produce substantially the same results in conjunction with the wheel brake coils as the speed sensors of FIGS. 3 through 8. Therefore, the manner of operation of the speed sensors of FIGS. 10 and 11, brakes, and associated circuitry, will be readily understood by those skilled in the art in view of the preceeding detailed description of the operation of the speed sensors of FIGS. 3 through 8 and will not be described in further detail.

From the foregoing description it will now be apparent that an anti-skid system and speed sensing switch constructed in accordance with the aforegoing disclosure provides an effective and reliable anti-skid protection particularly well adapted for use on trailers or other towed vehicles employing electric, pneumatic or hydraulic brakes. The anti-skid system of the present invention will automatically compensate for the unbalanced braking effort developed at opposite sides of a trailer which often results from the unbalanced load carried in the trailer. The system can be employed to modulate with an anti-skid effect the braking system whether full current or pressure is applied to the brakes or the braking effort is variable in accordance with the position of the brake pedal 19 in the towing vehicle. For example, in the system of FIG. 1 wherein full braking current is available as soon as switch 18 is closed, full braking effort is developed in the trailer brakes and maximum braking action is obtained because the wheels are kept on the brink of a skid condition. However, as indicated by the provision of the anti-sway control 24, the anti-skid system is also compatible with a variable resistance brake controller or variable duty cycle brake controller as well as with an on-off brake control switch.

Moreover, as indicated by the modification shown in FIG. 2, the anti-skid system of the present invention may be combined with the vehicle speed sensing switch 234 which is effective to disable the anti-skid modulation during a given range of absolute vehicle speed sensed by measuring the speed from the front wheels, transmission or other unbraked ground speed responsive element of the vehicle. For example, if it is desired to incorporate switch 234 in the system of FIG. 1 the same may be connected in series with lead 59 and hence relay coils CR2 and CR3 which controls the normally closed contacts 3C2 and 3C3 whereby, in the example previously given, when the vehicle is traveling between 0 and 10 m.p.h. relay coils CR2 and CR3 are de-energized by switch 234 and contacts 3C2 and 3C3 are opened, thereby allowing the crossover connections to be made to supply braking current to both wheel brakes. Above 10 m.p.h. vehicle speed switch 234 is closed and hence the anti-skid system can function as described previously. Switch 234 is advantageous in the system of FIG. 1 when it is desired to set the crossover speed of sensors 46 and 48 at a wheel speed corresponding to a vehicle speed less than that of switch 234, i.e., 5 m.p.h. for sensors 46 and 48 versus 10 m.p.h. for switch 234.

However, with the system of FIG. 1, switch 234 normally is not needed because the anti-skid modulation of the vehicle braking effort is automatically disabled by conjoint operation of sensors 46 and 48 below a given vehicle land speed, such as 10 m.p.h. Hence when the tractor and trailer have slowed down below this speed, full current as determined by the setting of the brake controller is applied to the trailer brakes so that full braking effort is available to bring the trailer to a halt. The crossover speed selected is sufficiently slow so that should skid conditions exist in this speed range, no danger will result from the skid this time. This crossover speed can be any value desired as selected by the adjustment or design of the speed sensing switches 46 and 48. Regardless of the speed selected, it will permit full braking power to be available for hill-holding or similar conditions.

In the case of mobile homes, travel trailers, or even camping trailers equipped with electric brakes, the anti-skid system of the present invention automatically compensates for unbalanced loading of the trailer. Such uneven loading may be either built-in by the manufacturer or may be due to misloading by the owner of the trailer, resulting in the wheel most heavily loaded having greater traction and causing the more lightly loaded wheel to go into a skid or locked up condition sooner than the more heavily loaded wheel.

The preferred embodiments of the wheel speed sensors as shown in FIGS. 3–8, 10 and 11, provide accurate, reliable and trouble-free wheel speed sensor installations which may be readily mounted on conventional trailer wheel spindles and hubs. The use of the glass encapsulated reed switches makes the units installable within the grease caps of the trailer axle without danger of contaminating the circuit connections. The crossover speed of the sensor 46 may be readily adjusted by adjusting the spacing between subassembly 322 and subassembly 324, as by adding shims between the wheel spindle face 314 and the housing 330, or by changing the value or size of the flyweight spring 388 or by varying the mass of the flyweight assembly 372–374. The unit is also readily accessible and removable for servicing.

Figure 9:
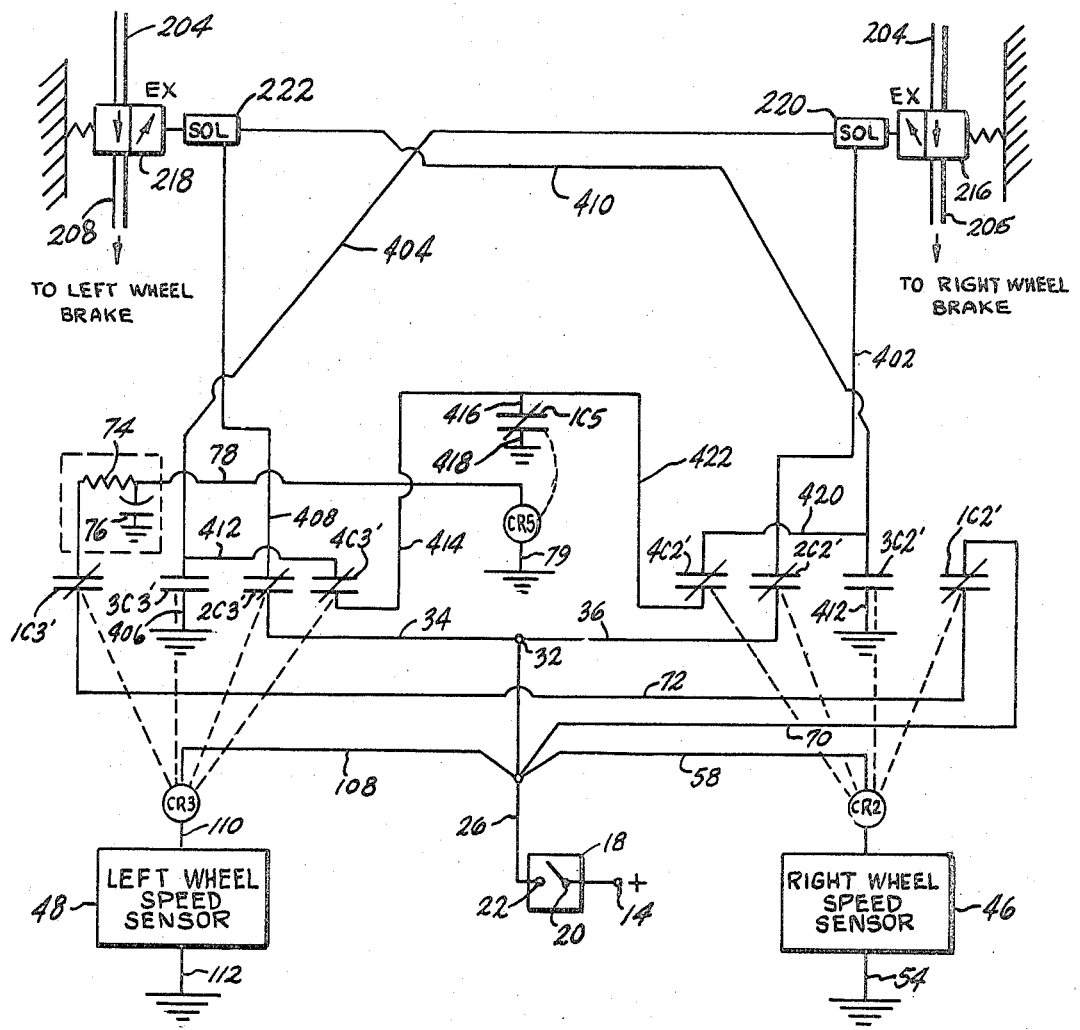
FIG. 9 is a third embodiment of an anti-skid system of the present invention applied to the pneumatic brake system of a towed vehicle.

FIG. 9 illustrates another embodiment of an anti-skid system in accordance with the present invention which illustrates the application of features of the anti-skid system of FIG. 1 to anti-skid control of a pneumatic brake system employing the solenoid controlled dump valves 216 and 218 of the system of FIG. 2. Accordingly, those components which are identical to components described previously in connection with FIGS. 1 and 2 are given like reference numerals and their description not repeated. Components bearing a similar relationship to those of FIGS. 1 and 2 are given a like reference numeral raised by a prime suffix.

It will be noted that contacts 1C3', 2C3' and 4C3' associated with relay coil CR3 of the left wheel speed sensor 48 and contacts 1C2', 2C2' and 4C2' associated with the relay coil CR2 of the right wheel speed sensor 46 are normally closed when relay coils CR3 and CR2 are deenergized, and that, under this condition, contacts 3C3' and 3C2' are open. Likewise, solenoids 220 and 222 are adapted to operate in the same mode as the corresponding solenoids in the system of FIG. 2; i.e., in the deenergized condition the associated spring biased valve 216 to its supply position, allowing flow of compressed air from tank 202 via line 204, valve 216 and line 206 to the associated right wheel brake, while blocking bleed of air to atmosphere from the right wheel brake cylinder. When solenoids 220 and 222 are energized, they move their associated valves to a "brake-released" position wherein the compressed air lines 205 and 208 associated respectively therewith are cut off from supply line 204 and then connected through the associated valve to atmosphere, thereby releasing air from the brake cylinder of the associated wheel to thus release its air brakes.

With the above and the previous description in mind, the operation of the system of FIG. 9 will be better understood from the following description. When the towing vehicle is at rest and the towing vehicle brake pedal 19 is applied, compressed air will be supplied from tank 202 via valve 200 to line 204, and simultaneously the stop light switch 18 will be closed to connect the positive terminal 14 of a battery or other DC source to lead 26. Under these at-rest conditions, the centrifugally actuated switches of right and left wheel speed sensors 46 and 48 will be open, and hence their associated relays CR2 and CR3 will be deenergized and thus the associated contacts 1C2'-4C2' and 1C3'-4C3' will be in the condition shown in FIG. 9. Hence, the energizing current circuit for solenoid 220 (consisting of terminal 14, switch 18, lead 26, branch lead 36, contacts 2C2', lead 402, solenoid 220, lead 404, contacts 3C3' and ground return lead 406) will be open at contacts 3C3'. Likewise, the energizing circuit for solenoid 222 (consisting of connections 14-34, contacts 2C3', lead 408, solenoid 222, lead 410, contacts 3C2' and ground return lead 412) will be open at contacts 3C2'. Due to these open circuit conditions, as well as that explained hereinafter, solenoids 220 and 222 cannot be energized and, therefore, valves 216 and 218 remain in the position shown in FIG. 9 wherein compressed air is supplied to the associated right and left wheel brakes to apply the air brakes.

In the system of FIG. 9, a shunt circuit to ground return is provided for each solenoid 220 and 222. This ground shunt path for solenoid 220 consists of lead 412 connected to lead 404, normally closed contacts 4C3' connected at one side to lead 412, lead 414 connected to the other side of contacts 4C3', lead 416 connected to lead 414, contacts 1C5 connects at one side to lead 416 and at the other side to a lead 418 connected to the ground return path. For solenoid 222 the ground shunt path consists of lead 420 connected to lead 410, contacts 4C2' connected at one side to lead 420, lead 422 connected to the other side of contacts 4C2' and to lead 416, contacts 1C5 and lead 418.

Contacts 1C5 are controlled by a relay coil CR5 which has an energizing circuit via connections 14-26, 70, 1C2', 72, 1C3', 74, 78 and 79, similar to relay coil CR4 of the system of FIG. 1. Hence, when switch 18 is closed by initial depression of brake pedal 19, and the towed vehicle is stationary, coil CR5 is thereby energized to open the normally closed contacts 1C5. This opens both ground shunt paths so tha open contacts 3C2' and 3C3' are not shunted to ground. Therefore, the open condition of the solenoid energizing circuits still obtains when the towed vehicle is stationary so that air will not be released from the air brakes under this condition.

It is to be understood that resistor 74 and capacitor 76 provide a time delay for delaying energization of relay coil CR5, regardless of whether such energization is in response to closure of switch 18, contacts 1C2' or contacts 1C3'. This time delay is in the order of 0.35 second and hence is only a fraction of the time it takes the air brake valve 200 to supply pressure air via valves 216 and 218 to actuate the wheel brakes. Thus, when the vehicle is stationary, contacts 1C5 are not opened as soon as switch 18 is closed, but rather in response to coil CR5 being energized after this brief time delay. However, this delay is not sufficiently long to unduly delay actuation of the air brakes when pedal 19 is depressed and the towed vehicle is stationary. One purpose of time delay network 74-76 is to provide an extra path to ground in each solenoid energizing circuit should contacts 3C2' and/or 3C3' be opened momentarily due to fluttering of the speed sensor switches of sensors 46 and/or 48; i.e., undergoing a very rapid make-and-break or chatter condition at high frequency, instead of being firmly open or closed as is the usual and desired mode of operation. Also, in the unusual event that both the left and right wheel brakes become locked up simultaneously while the towed vehicle is traveling above the crossover speed, causing contacts 3C2', 3C3', 1C2' and 1C3' to all open simultaneously, the delay caused by time delay network 74-76 in energization of relay coil CR5 insures that the shunt ground paths remain closed through contacts 1C5 for the short time required to release the wheel brakes and allow the wheels to reaccelerate back up over the crossover speed whereupon each of the wheel brakes will once again come under the anti-skid control of its associated sensor 46 or 48.

With the foregoing understood, assume that the towed vehicle is traveling at a speed above the crossover speed. If brake pedal 19 is depressed to apply the brakes, relay coils CR2 and CR3 both will be energized via switch 18 and their associated centrifugally closed speed sensor switches 46 and 48. This will cause contacts 1C2', 2C2', 4C2', 1C3', 2C3' and 4C3' to be opened, and will simultaneously cause contacts 3C2' and 3C3' to close. Although opening of contacts 1C2' and 1C3' will, after the aforementioned time delay, in turn deenergize relay coil CR5, thus closing contacts 1C5 in the ground shunt network, nevertheless, the towing vehicle brakes will be applied because contacts 2C2' and 3C2' are open and hence brake release solenoids 220 and 222 cannot be energized.

Assume that with the brakes thus applied the right wheel should not encounter skidding conditions so as to decelerate below the crossover speed. This will cause right wheel speed sensor 46 to open, thereby deenergizing relay coil CR2. This in turn will cause contacts 2C2', 1C2' and 4C2' to close and contacts 3C2' to open. Closing of contacts 2C2' will provide a closed energizing circuit for solenoid 220 via connections 14-32, 35, 2C2', 402, 220, 404, 3C3' and 406, thereby moving valve 216 to its exhaust position to thereby release the right wheel brakes. Ground traction on the right wheels now will reaccelerate the wheels rather rapidly back over the crossover speed, thereby causing the speed sensing switch of sensor 46 to be closed by centrifugal force. Relay coil CR2 is thereby reenergized and thus will open contacts 2C2' (as well as contacts 1C2' and 4C2'), thus opening the energizing circuit for solenoid 220. Valve 216 thereupon will be moved by its spring to the air supply position shown in FIG. 9 to cause reapplication of the air brakes to the right wheel (it being understood that the brake pedal is still being held depressed). If skidding conditions still are encountered, the above sequence will be repeated as soon as the braked right wheel decelerates below the crossover speed. As in the previous system, this will result in a rapid and automatic application and release of the brakes in the vicinity of the crossover speed so that maximum braking effort is developed because the braked wheel will be maintained on the verge of skidding. The same anti-skid control of the left wheel brakes of the towed vehicle occurs by operation of the speed sensor 48, as will be understood from the previous description.

From the foregoing, it now will be apparent that the anti-skid system of the invention applied to electrically controlled pneumatic braking systems as described and illustrated in connection with FIG. 9 insures that the vehicle has anti-skid control until the towed vehicle ground speed has been reduced to a safe condition, such as 8 to 10 miles per hour, whereupon both sensors 46 and 48 will cause the energizing circuits for the solenoids 220 and 222 to remain open so that air pressure cannot be released from either the right or left wheel brakes. As in the previous systems, this feature will permit application of the brakes when the vehicle is stationary or up to this crossover speed, under which conditions skidding hazards are minimal.

I claim:

1. A wheel speed sensing switch comprising a nonrotatable wheel spindle, a wheel rotatably mounted on said spindle, first and second reed switches mounted on said spindle perpendicular to one another and extending perpendicular to the axis of rotation of the wheel, said switches each having a pair of reeds with their free ends overlapped in a zone coincident with said rotational axis, and a switch actuating mechanism comprising a support connected to said wheel for rotation therewith, a permanent magnet flyweight polarized in the direction of said rotational axis and mounted on said support for rotation therewith, spring means biasing said flyweight to a first position wherein said magnet has its poles coaxial with said rotational axis, said magnet being pivotable on said support by centrifugal force acting on said flyweight from said first position radially outwardly relative to said rotational axis to a second position in response to rotation of said support from below to above a given speed. and circuit means connecting said switches in parallel.

2. A wheel speed sensing switch comprising a nonrotatable wheel spindle, a wheel rotatably mounted on said spindle, reed switch means mounted on said spindle in the vicinity of the axis of rotation of the wheel, said switch means having at least one pair of reeds with their free ends overlapped in a zone coincident with said rotational axis, and a switch actuating mechanism comprising a support connected to said wheel for rotation therewith, a permanent magnet flyweight polarized in the direction of said rotational axis and mounted on said support for rotation therewith and spring means biasing said flyweight to a first position wherein said magnet has its poles coaxial with said rotational axis, said magnet being pivotable on said support by centrifugal force acting on said flyweight from said first position radially outwardly relative to said rotational axis to a second position in response to rotation of said support from below to above a given speed, said reeds opening and closing at their free ends in response to movement of said magnet flyweight between said first and second positions.

3. A wheel speed sensing switch comprising a nonrotatable wheel spindle, a wheel rotably mounted on said spindle, a reed switch having a pair of reeds with their free ends overlapped, said reed switch being mounted on said spindle with its longitudinal axis generally coaxial with the axis of rotation of said wheel spindle, and a switch actuating mechanism comprising a support connected to said wheel for rotation therewith, a permanent magnet flyweight polarized in the direction of said rotational axis and mounted on said support for rotation therewith and for movement radially of said rotational axis, spring means biasing said flyweight to a first position wherein said magnet has its poles generally coaxial with said rotational axis, said magnet being movable on said support by centrifugal force acting on said flyweight from said first position to a second position radially outwardly spaced from said rotational axis in response to rotation to said support from below to above a given speed, said magnet being operable to induce sufficient magnetization in said reeds to engage said reeds and close said switch in the first position of said magnet and to allow said reeds to disengage and open said switch due to the reduction in the induced magnetization of said reeds caused by movement of said magnet to said second position.

* * * * *